(12) United States Patent
Ishikawa

(10) Patent No.: US 7,530,292 B2
(45) Date of Patent: May 12, 2009

(54) WAVE GEAR DRIVE HAVING HIGH RATCHETING TORQUE TOOTH PROFILE

(75) Inventor: Shoichi Ishikawa, Yokohama (JP)

(73) Assignee: Harmonic Drive Systems Inc., Tokyo (JP)

( * ) Notice: Subject to any disclaimer, the term of this patent is extended or adjusted under 35 U.S.C. 154(b) by 412 days.

(21) Appl. No.: 11/587,805

(22) PCT Filed: Jun. 7, 2004

(86) PCT No.: PCT/JP2004/007934

§ 371 (c)(1),
(2), (4) Date: Oct. 27, 2006

(87) PCT Pub. No.: WO2005/121597

PCT Pub. Date: Dec. 22, 2005

(65) Prior Publication Data

US 2008/0060466 A1     Mar. 13, 2008

(51) Int. Cl.
*F16H 33/00* (2006.01)
(52) U.S. Cl. ...................................... 74/640
(58) Field of Classification Search .............. 74/640, 74/437, 461, 411; 475/180, 904
See application file for complete search history.

(56) References Cited

U.S. PATENT DOCUMENTS 2,906,143 A     9/1959    Musser
3,187,605 A *   6/1965    Stiff ............................ 74/640

(Continued)

FOREIGN PATENT DOCUMENTS

| | | |
|---|---|---|
| JP | 45-41171 | 12/1970 |
| JP | 63-115943 | 5/1988 |
| JP | 64-079448 | 3/1989 |
| JP | 07-167228 | 7/1995 |

(Continued)

OTHER PUBLICATIONS

International Search Report from PCT/JP2004/007934.

*Primary Examiner*—Roger Pang
(74) *Attorney, Agent, or Firm*—Buchanan Ingersoll & Rooney PC

(57) ABSTRACT

A wave gear drive (1), wherein a rigid internal gear (2) is formed in a conical gear and a flexible external gear (3) is formed in a spur gear with a module m. The number of the teeth of the external gear (3) is reduced by the quantity of $2n$ (n is a positive integer) less than that of the internal gear (2), and the amount of the deflection of the major axis of the elliptic rim neutral line of the external gear (3) in the cross section perpendicular to the axis of the external gear (3) in the tooth trance direction is set to 2 κmn ($\kappa > 1$). In the cross section perpendicular to the axis at the intermediate part in the tooth trance direction, the engagement of the teeth of the both gears (2, 3) is approximated by the engagement of a rack to obtain the moving route (M) of the teeth of the external gear (3) according to the rotation of a wave generator (4). The curved portion (AB) of the moving route (M) ranging from the deepest engaged position (A) of both gears where the inclination angle of the moving route (M) relative to the radius line of the internal gear (2) is 90° to a position (B) where the inclination angle is α is obtained in an area ranging from the major axis to a tooth departure side. Then, a first analogous curve obtained by multiplying the curved portion (AB) by λ times is used as the tooth profile of the external gear (3), and a second analogous curve obtained by multiplying it by (λ+1) times is used as the tooth profile of the internal gear (2). The tooth crest of the internal gear (2) is formed so as to be positioned parallel with the bottom of the external gear (3) through a specified clearance on the axial section including the major axis after the deformation of the external gear (3).

10 Claims, 6 Drawing Sheets

U.S. PATENT DOCUMENTS

| | | |
|---|---|---|
| 5,687,620 A | 11/1997 | Ishikawa |
| 5,782,143 A | 7/1998 | Ishikawa |
| 5,918,508 A | 7/1999 | Ishikawa |
| 6,526,849 B1 | 3/2003 | Ishikawa |
| 7,328,632 B2 * | 2/2008 | Ishikawa ................. 74/640 |
| 2007/0180947 A1 * | 8/2007 | Ishikawa et al. .............. 74/640 |
| 2007/0266819 A1 * | 11/2007 | Ishikawa et al. .............. 74/640 |

FOREIGN PATENT DOCUMENTS

| | | |
|---|---|---|
| JP | 9-166186 | 6/1997 |
| JP | 2001-146945 | 5/2001 |
| RU | 2031278 C1 * | 3/1995 |
| WO | 96/19683 | 6/1996 |

* cited by examiner

[Fig. 1]
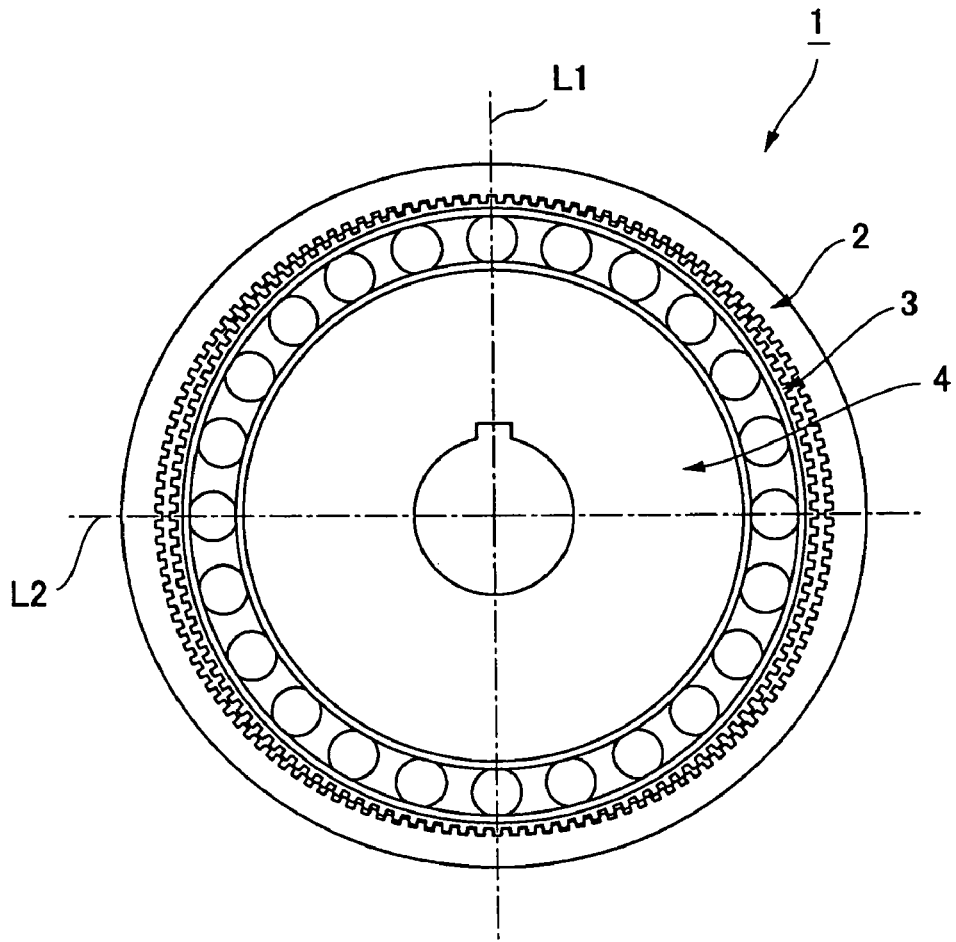
[Fig. 2]
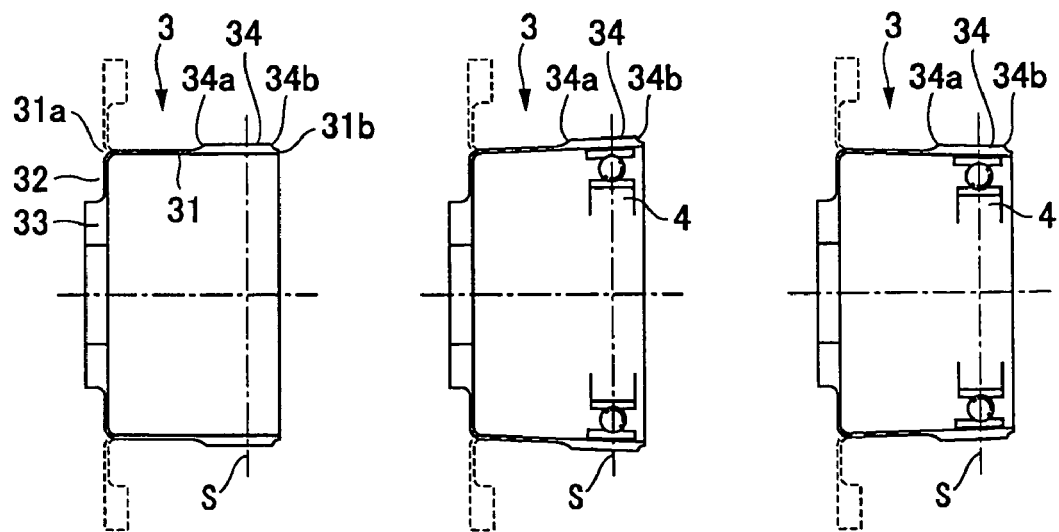

[Fig. 3]
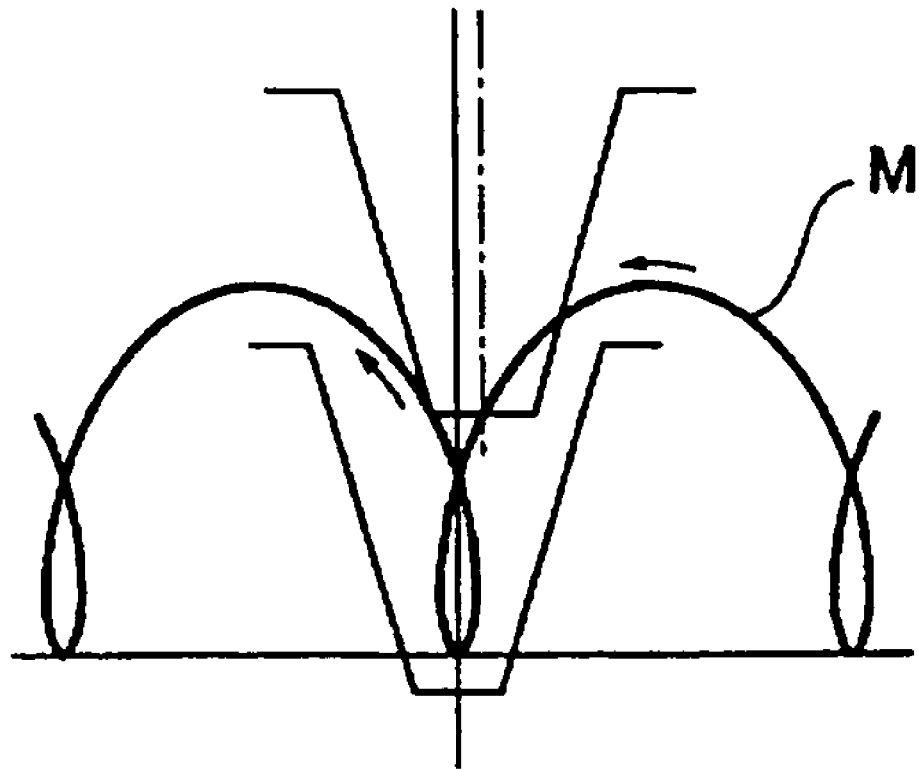
[Fig. 4]
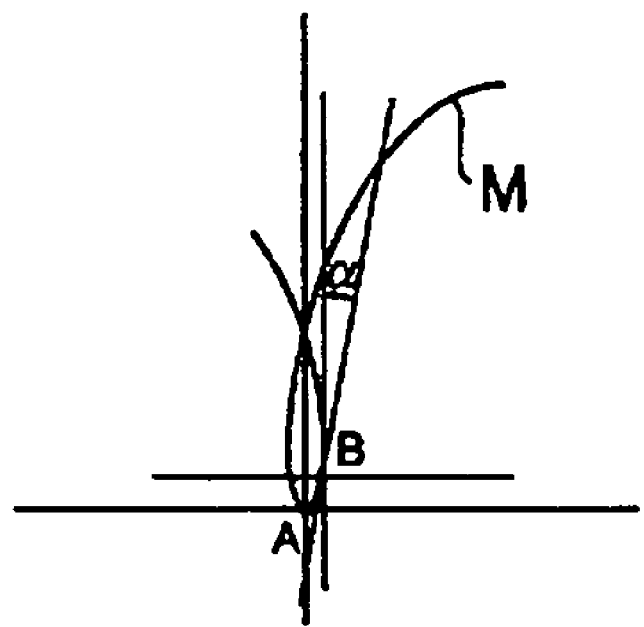

[Fig. 5]
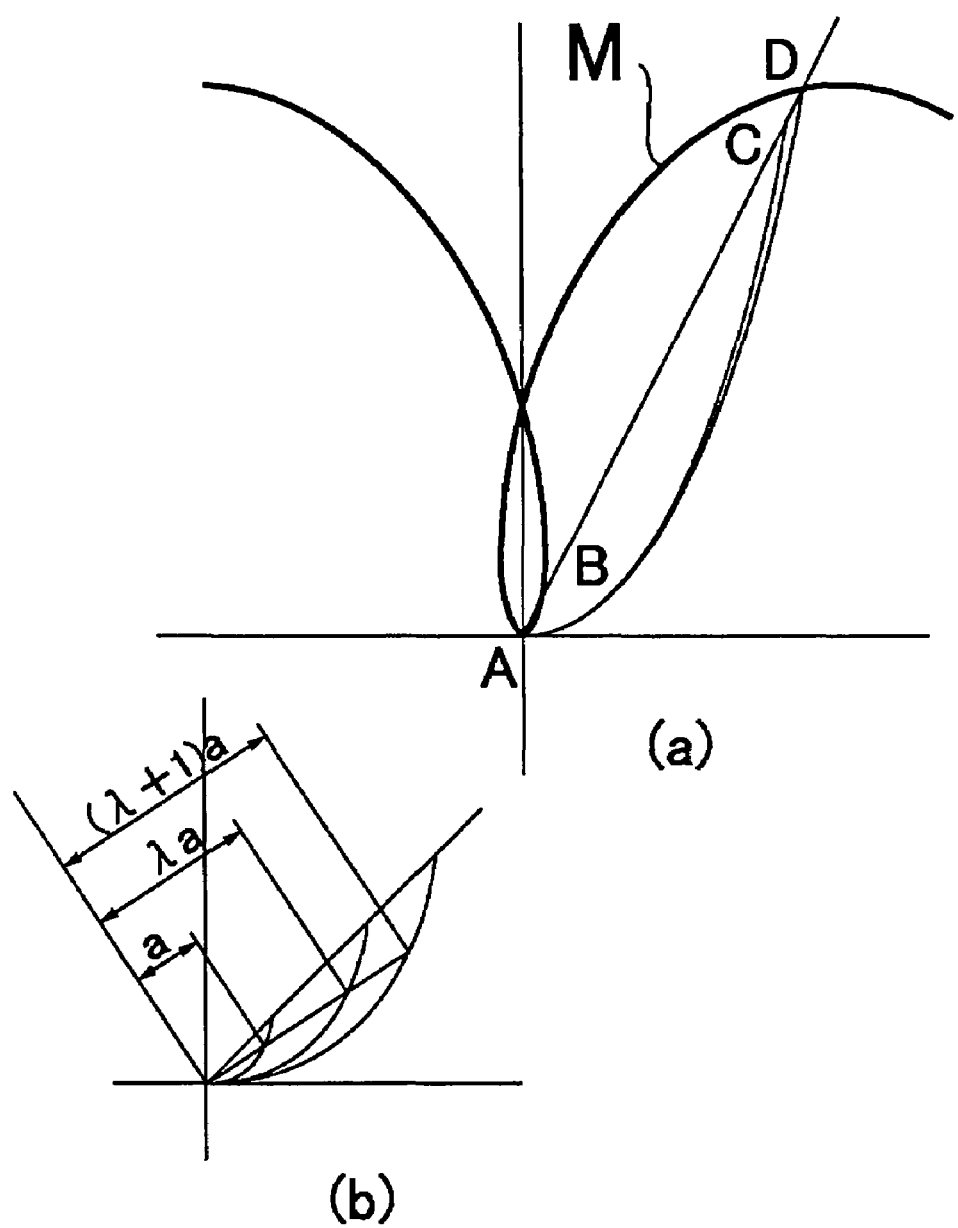

[Fig. 6]
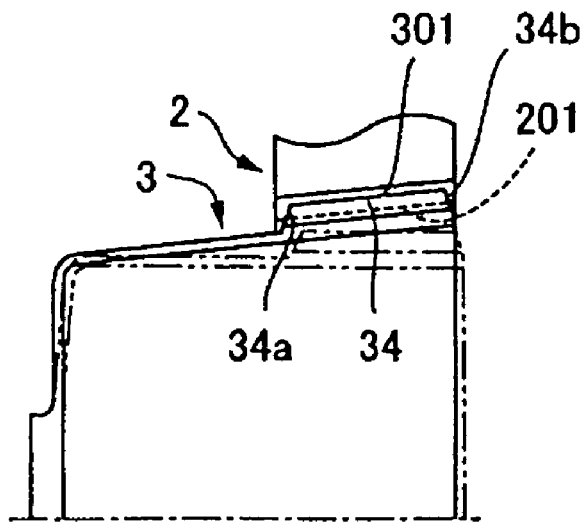
[Fig. 7]
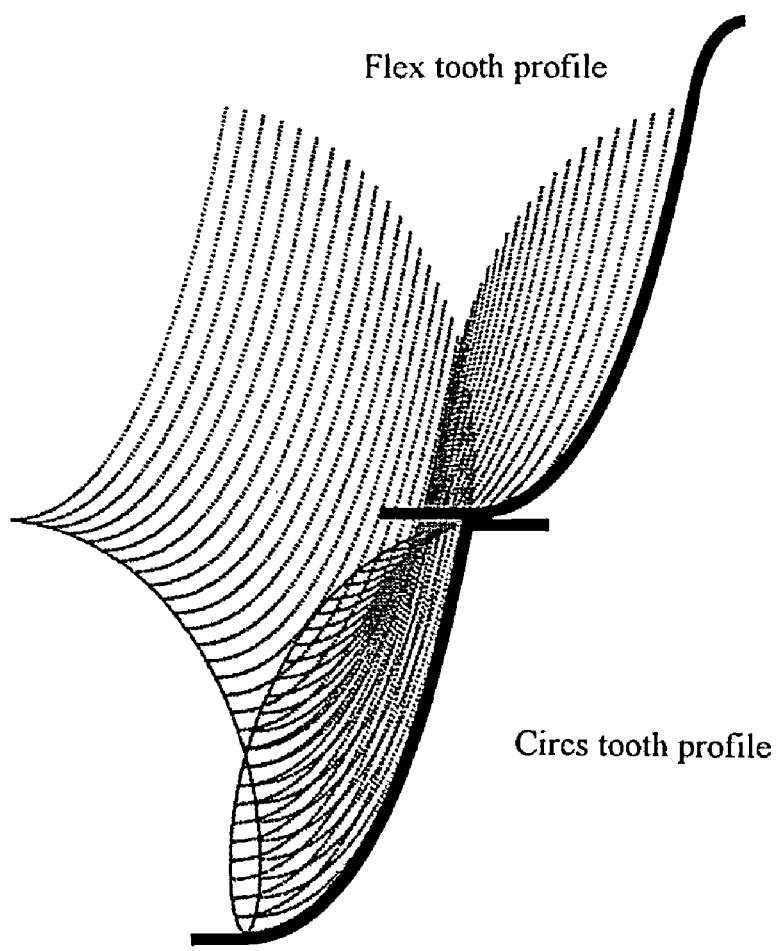

[Fig. 8]
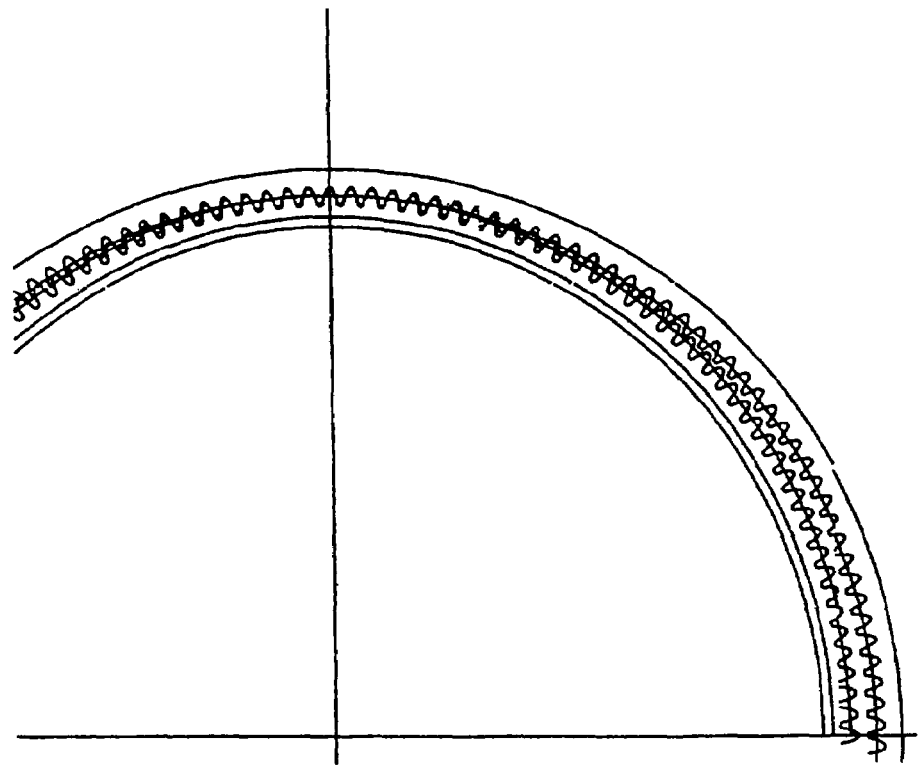
[Fig. 9]
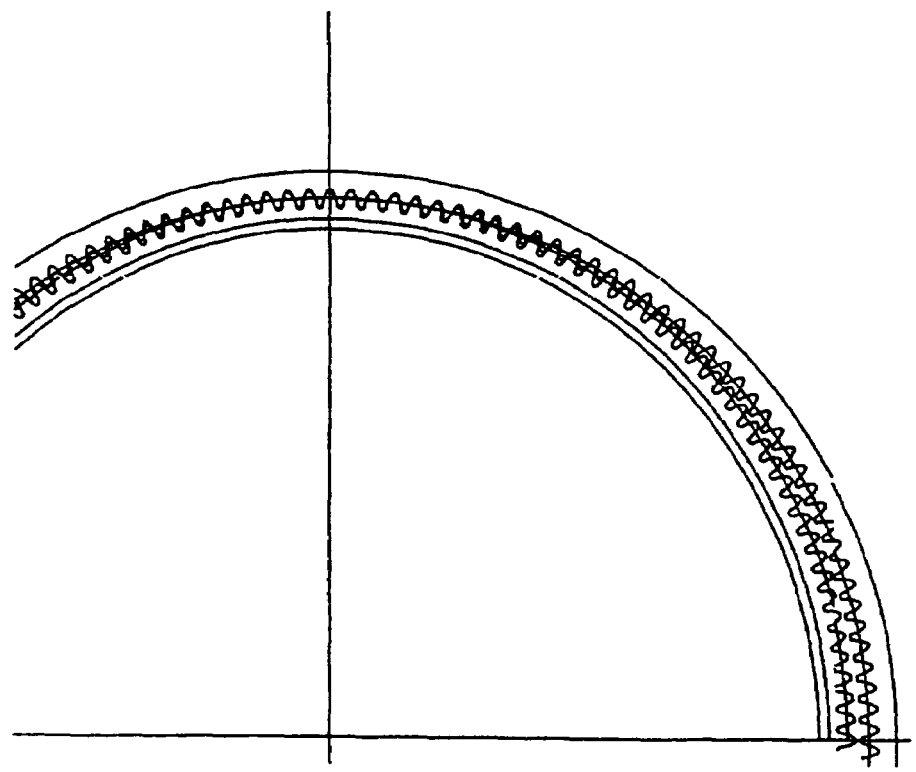

[Fig. 10]
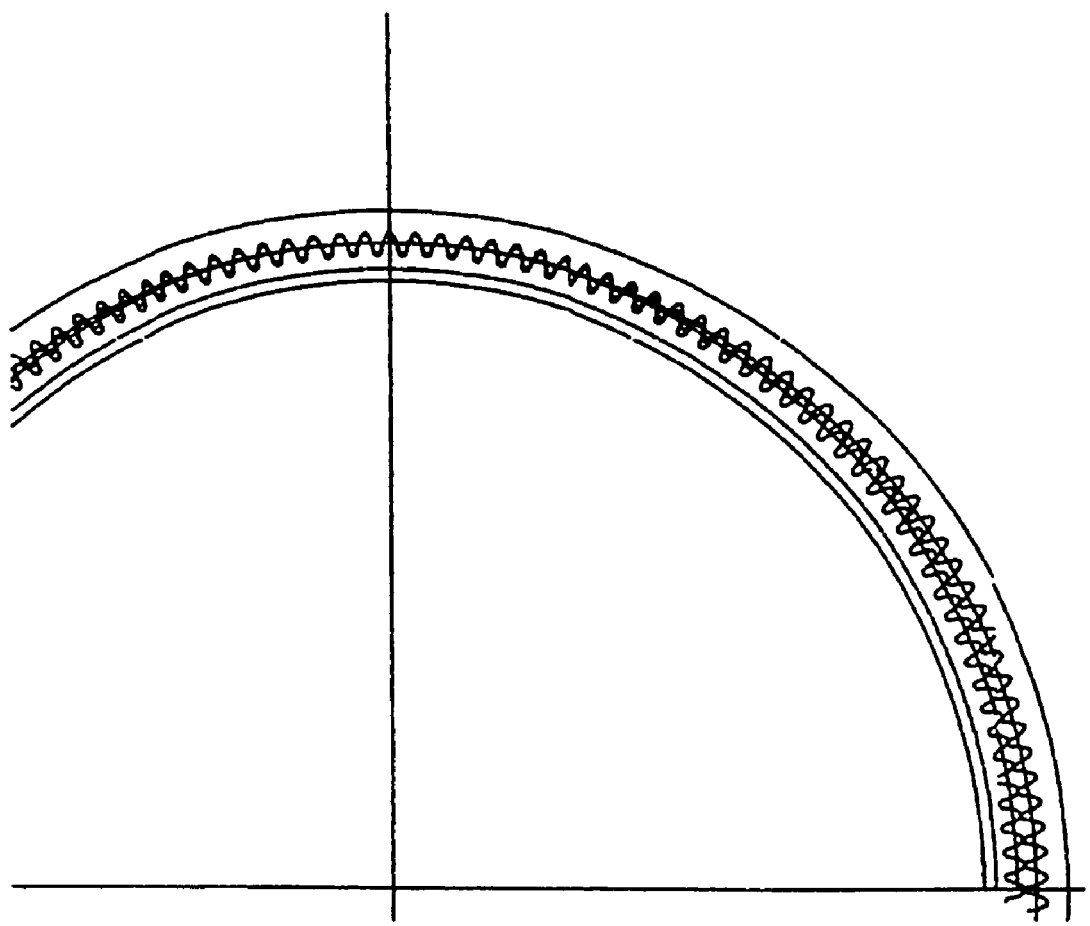

WAVE GEAR DRIVE HAVING HIGH RATCHETING TORQUE TOOTH PROFILE

TECHNICAL FIELD

The present invention relates to a wave gear drive, particularly a wave gear drive having a tooth profile that can prevent ratcheting during high reduction.

BACKGROUND ART

Since the wave gear drive was invented by C. W. Musser (Patent Reference 1) to the present day, various types of wave gear drives have been invented by many researchers, including Musser and the inventor of the present application. Various inventions have also been proposed relating just to tooth profiles of wave gear drives. For example, the inventor of the present application has proposed making the basic tooth profile of the rigid internal gear and flexible external gear that are component parts of a wave gear drive an involute tooth profile (Patent Reference 2), and a method of designing a tooth profile in which the tooth addendum profiles for wide contact between the rigid internal gear and the flexible external gear are derived using a rack approximation of the engagement between the two gears (Patent References 3 and 4). There has also been proposed an invention for avoiding interference between rack-approximated tooth profiles (Patent Reference 5).

Patent Reference 1: U.S. Pat. No. 2,906,143
Patent Reference 2: JP 45-41171 B
Patent Reference 3: JP 63-115943 A
Patent Reference 4: JP 64-79448 A
Patent Reference 5: JP 7-167228 A

DISCLOSURE OF THE INVENTION

Problems to be Solved by the Invention

With wave gear drives, in the case of high reduction ratios in which the number of the teeth of the two gears exceeds, for example, 160, during high load torque there is a risk of the phenomenon of tooth-skipping, what is called ratcheting, occurring. However, there is no specific proposal with respect to a tooth profile that can prevent ratcheting while continuously maintaining contact.

In order to prevent ratcheting during high load torque, the tooth depth of the two gears of the wave gear drive has to be made as large as possible. It is also necessary to widen the region of engagement of the two gears, increasing the torque capacity.

In view of the above points, the purpose for the present invention is to propose a wave gear drive that, in order to prevent ratcheting during high load torque, has a tooth profile that enables the tooth depth to be enlarged and, moreover, enables the engagement in a state of continuous contact.

Means for Solving the Problems

The present invention solves the above problems in a wave gear drive having a circular rigid internal gear, inside which is disposed a flexible external gear, inside which a wave generator is inserted, the flexible external gear having a flexible cylindrical body and an annular diaphragm that extends in a radial direction from a back end of the cylindrical body, a tooth portion formed on an opening end side region of the cylindrical body being flexed into an elliptic shape by a deflection amount generated by the wave generator from a back end portion on the diaphragm side to a front end portion on the opening end side thereof that is approximately proportional to distance from the diaphragm,
characterized in that:
the rigid internal gear is a conical gear with a module m,
the flexible external gear is a spur gear with a module m,
a number of teeth of the flexible external gear is 2n (n being a positive integer) fewer than a number of teeth of the rigid internal gear,
the deflection amount of the major axis of the elliptic rim neutral line of the flexible external gear in a cross-section of the flexible external gear perpendicular to the axis in the direction of the tooth trace thereof is set to be $2\kappa mn (\kappa>1)$,
the engagement of the teeth of the rigid internal gear and flexible external gear in a cross-section of the flexible external gear perpendicular to the axis in an intermediate portion in the direction of the tooth trace thereof (hereinafter referred to as the main cross-section) is approximated as rack engagement and the moving route of the teeth of the flexible external gear with respect to the teeth of the rigid internal gear that accompanies rotation of the wave generator is obtained,
from the major axis to a tooth departure side on the moving route, employing a curved portion from a deepest engaged position of the two gears at which an inclination angle of a radial line to the moving route of the rigid internal gear is 90° to the position at which the inclination angle is $\alpha$ ($0°<\alpha<30°$),
employing as a tooth profile of the flexible external gear a first analogous curve obtained by enlarging the curved portion by $\lambda$ times, and
employing as a tooth profile of the rigid internal gear a second analogous curve obtained by enlarging the curved portion by $(\lambda+1)$ times.

In the tooth profile obtained, the inclination angle $\alpha$, corresponds to the minimum pressure angle of the tooth dedendum in the case of the flexible external gear, and the tooth addendum in the case of the rigid internal gear. In practice, it is desirable to use a value within the range of from 0° to 15°.

Here, in order to obtain a high ratcheting torque, tooth depth must be made as large as possible. For this, $\lambda$ is made as large as possible. The $\lambda$ maximum value is a position on the moving route to which the tooth addendum of the rigid internal gear comes; making $\lambda$ any larger causes interference between the addenda of the two gears. Therefore, in the present invention, it is desirable to set the value of $\lambda$ so that the apex of the second analogous curve obtained by multiplying the curved portion as the origin of the deepest engaged position by $(\lambda+1)$ times is positioned on the moving route.

Also, with respect to the extreme value of the maximum value of $\lambda$, there are cases in which the tooth addendum of the rigid internal gear is selected as the location of the maximum amplitude of the moving route. In the present invention, therefore, it is desirable to set the values of $\lambda$ and $\alpha$ so that the apex of the second analogous curve obtained by multiplying the curved portion as the origin of the deepest engaged position by $(\lambda+1)$ times is positioned at the maximum amplitude point of the moving route.

Moreover, in the case of this invention, in order to ensure that effective engagement of the two gears can be maintained at a region other than the main cross-section of the flexible external gear, the rigid internal gear is made a conical gear. In this case, in order to maintain high tooth engagement at each cross-section perpendicular to the axis in addition to the main cross-section of the flexible external gear in the direction of the tooth trace thereof, the following is desirable. That is, the rigid internal gear is formed so the tooth crest of the rigid internal gear comes into parallel opposition with the tooth bottom of the flexible external gear through a specified clearance on the axial cross-section including the major axis after deformation of the flexible external gear.

Next, the present invention is suitable for use in a wave gear drive having a high reduction ratio in which the number of teeth of the two gears is 160 or more.

EFFECT OF THE INVENTION

As described in the foregoing, since in the wave gear drive of the present invention the tooth depth of the teeth of the rigid internal gear and the flexible external gear is related to the deflection amount, the deflection amount in the radial direction of the flexible external gear, over the whole range in the direction of the tooth trace, is set to be 2 κmn(κ>1), which is larger than the standard deflection amount of 2 mn. Also, in the main cross-section continuous contact of the two gears is effected by rack approximating the moving track of the engagement of the teeth of the two gears, and using as the basic tooth profile of both gears a curve that is the curve on the departure side of the post-stage engagement from the deepest engaged position that is the apex of the rack moving route that is analogously enlarged. Therefore, the high tooth depth of the teeth of both gears can be maintained in all tooth trace directions, in addition to which, at the cross-section perpendicular to the axis in all tooth trace directions, it is possible to achieve engagement in the region after reaching the major axis of the deepest engaged portion.

Also, the flexible external gear has been made a spur gear and the rigid internal gear has been made a conical gear of a prescribed shape, making it possible to ensure a tooth depth having the required effect.

Thus, in accordance with this invention, a wave gear drive having a high load torque performance is realized that can prevent ratcheting during high load torque.

BEST MODE FOR CARRYING OUT THE INVENTION

A wave gear drive that applies the present invention is described below, with reference to the drawings.

(Configuration of the Wave Gear Drive)

FIG. 1 is a front view of the wave gear drive that is the object of the present invention, FIG. 2 is a cross-sectional diagram showing an axial cross-section that includes the opening portion of the flexible external gear thereof in the condition of being flexed into an elliptic shape, with (a) showing the state before deformation, (b) a cross-section that includes the major axis of the ellipse after deformation, and (c) a cross-section that includes the minor axis of the ellipse after deformation. In addition, in FIG. 2 a solid line shows a cup-shaped flexible external gear, and a broken line shows a silk-hat-shaped flexible external gear.

As shown in these drawings, the wave gear drive 1 has a circular, rigid internal gear 2, inside which is disposed a flexible external gear 3 in which a wave generator 4 is disposed. The difference between the number of teeth of the rigid internal gear 2 and flexible external gear 3 is 2n (n is a positive integer). The flexible external gear 3 of the wave gear drive 1 is flexed into an ellipse by the wave generator 4 having an elliptic profile, engaging with the rigid internal gear 2 at the two end portions in the direction of the major axis L1 of the ellipse. When the wave generator 4 rotates, the position of engagement of the two gears 2, 3 moves circumferentially, generating relative rotation between the two gears 2, 3 that corresponds to the difference in the number of teeth of the two gears. The flexible external gear 3 comprises a flexible cylindrical body 31, a diaphragm 32 expanding radially that is continuous with a back end 31a thereof, a boss 33 that is continuous with the diaphragm 32, and external teeth 34 formed on an outer peripheral surface portion of an opening end 31b side of the cylindrical body 31.

By means of the wave generator 4 having an elliptic profile inserted in the inside peripheral surface portion of the external teeth formation portion of the cylindrical body portion 31, the amount by which the cylindrical body portion 31 is flexed radially inwards or outwards from the back end 31a of the diaphragm side thereof towards the opening end opening end 31b is gradually increased. As shown in FIG. 2(b), the outward deflection amount in a cross-section that includes the major axis L1 of the ellipse gradually increases proportional to distance from the back end 31a to the opening end 31b, and as shown in FIG. 2(c), the inward deflection amount in a cross-section that includes the minor axis L2 of the ellipse gradually increases proportional to distance from the back end 31a to the opening end 31b.

Therefore, the deflection amount of the external teeth 34 portion (teeth portion) formed on the outer peripheral surface portion of the opening end 31b side also gradually increases from the back end portion 34a to the front end portion 34b in the tooth trace direction thereof, proportional to the distance from the cylindrical body back end 31a.

(Method of Forming Tooth Profile in Main Cross-Section)

FIG. 3 is a diagram showing the moving route of the teeth of the flexible external gear 3 with respect to the rigid internal gear 2, obtained in a case in which the relative movement of the two gears 2, 3 of the wave gear drive 1 are rack-approximated. Taking the main cross-section constituting the basis of the formation of the tooth profiles of the two gears as a cross-section perpendicular to the axis of an intermediate portion between the back end portion 34a and front end portion 34b in the direction of the tooth trace of the external teeth 34 of the flexible external gear 3 (the cross-section at the location indicated in FIG. 2 by line S), this moving route M is that which is obtained in this main cross-section S. The moving route M of the teeth of the gear 3 is given by the following equation.

$$x = 0.5\,mn(\theta - \kappa \sin \theta)$$

$$y = \kappa mn(1 - \cos \theta)$$

Here, κ is a flexing coefficient that is greater than "1", m is module. In addition, the total amplitude of the moving route M of the flexible external gear 3 is 2 κmn.

FIG. 4 is an explanatory diagram showing the utilization range set in the loop part of the tooth moving route M. The curved portion AB is used that is from point A of the deepest engaged part to an engagement departure part to point B at an angle α from the deepest position point A at which the angle of inclination (pressure angle) of a tangent of the moving route M formed with respect to the y axis (radial line of the rigid internal gear) is 90°. Generally the range of the angle α is 0°<α<30°, and practically is 0°<α<15°.

This curved portion is used to obtain the tooth profile, as described below. With an engagement with a positive deflection (κ>1), a tooth of the flexible external gear 3 that enters a tooth space of the rigid internal gear 2 does not contact as far as the deepest position A, and first contacts the tooth face of the internal gear 2 as it disengages on the departure side.

Next, as shown in FIG. 5(a), the working range of the moving route, that is, the curved portion AB is multiplied by λ (λ is a real number) to obtain a first analogous curve AC that is employed as the tooth profile of the flexible external gear 3.

Also, the curved portion AB is multiplied by $(\lambda+1)$ to obtain a second analogous curve AD that is employed as the tooth profile of the rigid internal gear 2. As shown by the principle of the two tooth profiles thus set, shown in FIG. 5(*b*), from their analogous nature, continuous engagement is possible between the curved portions AB.

Here, it is necessary to make the tooth depth as large as possible in order to increase the ratcheting torque. To do this, $\lambda$ is made as large as possible. The maximum value thereof is the position to which the tooth crest of the rigid internal gear 2 comes on the moving route M. If it is made larger there is interference between the addenda of the two gears. FIG. 5(*a*) shows this case. The extreme value of the maximum value of $\lambda$ is a case in which the tooth crest of the rigid internal gear is selected as the location of the maximum amplitude of the moving route M.

That is, the theoretical value of the angle $\alpha$ (pressure angle) relating to the extreme value of the maximum value of $\lambda$ can be obtained from the following equation.

$$\tan \alpha = 0.5(1 - \kappa \cos t)/(\kappa \sin t)$$

Here, the enlargement ratio $(\lambda+1)$ of the moving route M will be the following value.

$$\lambda + 1 = 2 \kappa m/\kappa m(1 - \cos t) = 2/(1 - \cos t)$$

Also, the value of t is a value that can be obtained from the following equation.

$$t - \kappa \sin t + 0.5\pi \cos t - 0.5\pi = 0$$

As an example, if the flexing coefficient $\kappa=1.4$, then $t=26.1272°$, $\alpha=11.7712°$, $\lambda=18.5730°$.

(Tooth Profile of a Cross-Sectional Location Perpendicular to the Axis other than the Main Cross-Section)

The foregoing explanation relates to the main cross-section of the flexible external gear 3, that is, to a method of forming a tooth profile in a cross-section perpendicular to the axis of the intermediate portion in the direction of the tooth trace of that tooth. A tooth profile may be formed as follows to maintain effective engagement in a cross-section perpendicular to the axis other than the main cross-section.

First, in the flexible external gear 3, on the back end portion 34*a* in the tooth trace direction the deflection amount of the major axis of the elliptic rim neutral line at the back end portion 34*a* in the direction of the tooth trace of the flexible external gear 3 is set at 2 $\kappa$mn ($\kappa > 1$). In other words, the teeth of the flexible external gear 3 is given a positive deflection tooth profile. As a result, at the cross-section perpendicular to the axis in all tooth trace directions, it is possible to achieve engagement of the teeth of both gears in the region after major axis of the deepest engaged portion has been reached.

Next, to enable high tooth engagement to be maintained at each cross-section in the direction of the tooth trace from the front end portion 34*b* on the opening side to the back end portion 34*a*, the flexible external gear 3 is formed as a spur gear with a module m, and the rigid internal gear 2 is formed as a conical gear that can mesh therewith. Here, as shown in FIG. 6, on the axial cross-section that includes the major axis of the wave generator 4 (that is, on a cross-section that includes the major axis of the flexible external gear 3 flexed into an elliptic shape), the tooth crest 201 of the rigid internal gear 2 is formed to come into parallel opposition with the tooth bottom 301 of the teeth of the flexible external gear 3, through a set clearance. Also, in FIG. 6, the imaginary lines show the state before deformation of the flexible external gear 3.

FIGS. 7 to 10 show examples of the engagement state of tooth profiles thus formed. In these drawings, the engagement of the two gears 2, 3 is shown as rack-approximated relative movement of the flexible external gear 3 with respect to a tooth of the rigid internal gear 2. FIG. 7 shows the state of engagement of the main cross-section; in this drawing, "flex tooth profile" represents the tooth profile of the flexible external gear, and "circs" represents the tooth profile of the rigid internal gear. FIG. 8 is a drawing showing the development of post-stage engagement from past the position of the major axis at the front end portion 34*b*, in a case in which tooth depth of both gears is at the maximum; FIG. 9 shows the development of the engagement at the cross-section in the center of the tooth trace; and FIG. 10 shows the development of the engagement of the back end portion 34*a* in the tooth trace direction.

BRIEF DESCRIPTION OF DRAWINGS

FIG. 1 is a general front view of a wave gear drive that is an object of the present invention.

FIG. 2 is an explanatory diagram showing an axial cross-section that includes the flexing condition of the flexible external gear, with (a) showing the state before deformation, (b) a cross-section that includes the major axis of the ellipse after deformation, and (c) a cross-section that includes the minor axis.

FIG. 3 is the moving route of a rack in a case in which the basis of the tooth profile formation of the present invention is $\kappa > 1$.

FIG. 4 is an explanatory diagram showing, among the moving routes of FIG. 3, the utilization range for tooth profile formation.

FIG. 5 is an explanatory diagram showing an example of the tooth profiles set for the two gears.

FIG. 6 is an explanatory diagram showing the tooth shape of the two gears employed to realize effective engagement other than at the main cross-section in a first aspect of the embodiment.

FIG. 7 is an explanatory diagram showing engagement in the main cross-section of the two gears.

FIG. 8 shows the development of engagement in a cross-section perpendicular to the axis of the front end portion on the opening side of the tooth trace of the two gears.

FIG. 9 shows the development of engagement in a cross-section perpendicular to the axis in the center of the tooth trace of the two gears.

FIG. 10 shows the development of engagement in a cross-section perpendicular to the axis in the back end portion of the tooth trace of the two gears.

EXPLANATION OF SYMBOLS

1 Wave gear drive
2 Internal gear
3 External gear
31*a* Back end
31*b* Opening end
34 External teeth
34*a* Back end portion in direction of tooth trace
34*b* Front end portion in direction of tooth trace
201 Tooth crest
301 Tooth bottom
4 Wave generator
M Moving route
AB Curved portion used to set tooth profile
AC First analogous curve
AD Second analogous curve
A Deepest position of moving route B Point at which inclination angle of tangent on the moving route is α

S Main cross-section

The invention claimed is:

1. A wave gear drive having a circular rigid internal gear, inside which is disposed a flexible external gear, inside which a wave generator is inserted, the flexible external gear having a flexible cylindrical body and an annular diaphragm that extends in a radial direction from a back end of the cylindrical body, a tooth portion formed on an opening end side region of the cylindrical body being flexed into an elliptic shape by a deflection amount generated by the wave generator from a back end portion on the diaphragm side to a front end portion on the opening end side thereof that is approximately proportional to distance from the diaphragm, wherein:

the rigid internal gear is a conical gear with a module m, the flexible external gear is a spur gear with a module m, a number of teeth of the flexible external gear is 2n (n being a positive integer) fewer than a number of teeth of the rigid internal gear, a deflection amount of the major axis of an elliptic rim neutral line of the flexible external gear in a cross-section of the flexible external gear perpendicular to an axis in a direction of the tooth trace thereof is set to be 2 κmn (κ>1), engagement of the teeth of the rigid internal gear and flexible external gear in a cross-section of the flexible external gear perpendicular to the axis in an intermediate portion in the direction of the tooth trace thereof (hereinafter referred to as the main cross-section) is approximated as rack engagement and a moving route of the teeth of the flexible external gear with respect to the teeth of the rigid internal gear that accompanies rotation of the wave generator is obtained, from the major axis to a tooth departure side on the moving route, employing a curved portion from a deepest engaged position of the two gears at which an inclination angle of a radial line to the moving route of the rigid internal gear is 90° to a position at which the inclination angle is α(0°<α<30°), employing as a tooth profile of the flexible external gear a first analogous curve obtained by enlarging the curved portion by λ times, and employing as a tooth profile of the rigid internal gear a second analogous curve obtained by enlarging the curved portion by (λ+1) times.

2. The wave gear drive of claim 1, wherein the value of λ is set so that an apex of the second analogous curve obtained by multiplying the curved portion as the origin of the deepest engaged position by (λ+1) times is positioned on the moving route.

3. The wave gear drive of claim 1, wherein the values of λ and α are set so that an apex of the second analogous curve obtained by multiplying the curved portion as the origin of the deepest engaged position by (λ+1) times is positioned at the maximum amplitude point of the moving route.

4. The wave gear drive of claim 1, wherein the rigid internal gear is formed so the tooth crest of the rigid internal gear comes into parallel opposition with the tooth bottom of the flexible external gear, at a set clearance, on the axial cross-section including the major axis after deformation of the flexible external gear.

5. The wave gear drive of claim 1, wherein the rigid internal gear and the flexible external gear each have 160 or more teeth.

6. The wave gear drive of claim 2, wherein the rigid internal gear is formed so the tooth crest of the rigid internal gear comes into parallel opposition with the tooth bottom of the flexible external gear, at a set clearance, on the axial cross-section including the major axis after deformation of the flexible external gear.

7. The wave gear drive of claim 3, wherein the rigid internal gear is formed so the tooth crest of the rigid internal gear comes into parallel opposition with the tooth bottom of the flexible external gear, at a set clearance, on the axial cross-section including the major axis after deformation of the flexible external gear.

8. The wave gear drive of claim 2, wherein the rigid internal gear and the flexible external gear each have 160 or more teeth.

9. The wave gear drive of claim 3, wherein the rigid internal gear and the flexible external gear each have 160 or more teeth.

10. The wave gear drive of claim 4, wherein the rigid internal gear and the flexible external gear each have 160 or more teeth.

* * * * *